(12) United States Patent
Suzuki

(10) Patent No.: US 6,894,847 B2
(45) Date of Patent: May 17, 2005

(54) RETROFOCUS, WIDE-ANGLE LENS

(75) Inventor: Takashi Suzuki, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 10/743,824

(22) Filed: Dec. 24, 2003

(65) Prior Publication Data

US 2004/0136095 A1 Jul. 15, 2004

(30) Foreign Application Priority Data

Jan. 14, 2003 (JP) ........................... 2003-005380

(51) Int. Cl.$^7$ ............... G02B 13/04; G02B 15/14
(52) U.S. Cl. ........................... 359/749; 359/680
(58) Field of Search ..................... 359/680, 681, 359/684, 691, 749, 750, 754, 755, 793

(56) References Cited

U.S. PATENT DOCUMENTS

| | | | | |
|---|---|---|---|---|
| 3,884,556 A | * | 5/1975 | Nakagawa | 359/750 |
| 5,159,493 A | * | 10/1992 | Tsutsumi | 359/680 |
| 6,621,645 B2 | | 9/2003 | Sato | |

FOREIGN PATENT DOCUMENTS

| | | |
|---|---|---|
| JP | S57-158609 | 9/1982 |
| JP | H7-261076 | 10/1995 |
| JP | 2002-214526 | 7/2002 |

* cited by examiner

Primary Examiner—Georgia Epps
Assistant Examiner—Alicia M. Harrington
(74) Attorney, Agent, or Firm—Arnold International; Jon W. Henry; Bruce Y. Arnold (57) ABSTRACT

A retrofocus, wide-angle lens includes a first lens group of negative refractive power, a stop, and a second lens group of positive refractive power. The first lens group includes, in order from the object side, a meniscus lens elements having positive refractive power, two meniscus lens elements having negative refractive power, and a thick lens element. The second lens group includes a cemented lens component that includes a lens element having negative refractive power and a biconvex lens element that is on the object side of a meniscus lens element having negative refractive power with its concave surface on the object side. The second lens group may include a meniscus lens component having positive refractive power on the object side of the biconvex lens element and a meniscus lens component having positive refractive power on the image side of the meniscus lens element having negative refractive power.

20 Claims, 4 Drawing Sheets

Spherical Aberration
Fig. 4A

Astigmatism
Fig. 4B

Distortion
Fig. 4C

Lateral Color
Fig. 4D

Spherical Aberration
Fig. 5A

Astigmatism
Fig. 5B

Distortion
Fig. 5C

Lateral Color
Fig. 5D

Spherical Aberration
Fig. 6A

Astigmatism
Fig. 6B

Distortion
Fig. 6C

Lateral Color
Fig. 6D

RETROFOCUS, WIDE-ANGLE LENS

BACKGROUND OF THE INVENTION

Generally, in a wide-angle lens for a single lens reflex camera, a retrofocus lens construction has been used that includes a lens group having negative refractive power and a lens group having positive refractive power arranged in that order from the object side. The lens groups define an asymmetric arrangement about a stop used as an aperture stop in order to provide a desirably long back focal length of the retrofocus, wide-angle lens. Examples of such retrofocus, wide angle lenses are described in Japanese Laid-Open Patent Application 2002-214526 and Japanese Laid-Open Patent Application H07-261076.

Although each of the above-mentioned retrofocus, wide-angle lenses provides an adequate back focal length, the correction of aberration is at large field angles—especially the correction of lateral color—is difficult due to the asymmetric construction about the stop. Because digital cameras use detectors having light receiving characteristics that are different from that of photographic film, digital cameras require better correction of lateral color than that provided by the retrofocus, wide-angle lenses of the above-mentioned Japanese patent applications. For example, Japanese Laid-Open Patent Application 2002-214526 describes using two lens elements of special low-dispersion glass in the positive lens group, but the lenses described in that Japanese application do not provide the desired correction of lateral color.

BRIEF SUMMARY OF THE INVENTION

The present invention relates to a retrofocus, wide-angle lens with a long back focus that provides favorable correction of lateral color and is suitable for use in a medium-sized, single lens reflex camera.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION OF THE INVENTION

First, definitions of the terms "lens element," "lens component," and "lens group," that relate to the following detailed description will be given. The term "lens element" is herein defined as a single transparent mass of refractive material having two opposed refracting surfaces, which surfaces are positioned at least generally transverse to the optical axis of the retrofocus, wide-angle lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus sonic lens elements may also be lens components. Therefore, the terms "lens element" and "lens component" should not be taken as mutually exclusive terms. In fact, the terms may be used to describe a single lens element in accordance with part (a) above of the definition of a "lens component."

The term "lens group" is herein defined as a group of one or more lens components in optical series along an optical axis that, for known purposes of lens evaluation and lens design, may be considered equivalent to a single lens element. Known lens design and evaluation techniques determine whether a group of one or more lens components in optical series is properly considered a lens group. As more precise lens evaluation and lens design techniques are considered, a lens group that includes more than one lens component may be divided into further lens groups, and that process of division may proceed, in some cases, until a lens group that includes only one lens component is identified.

Figure 1:
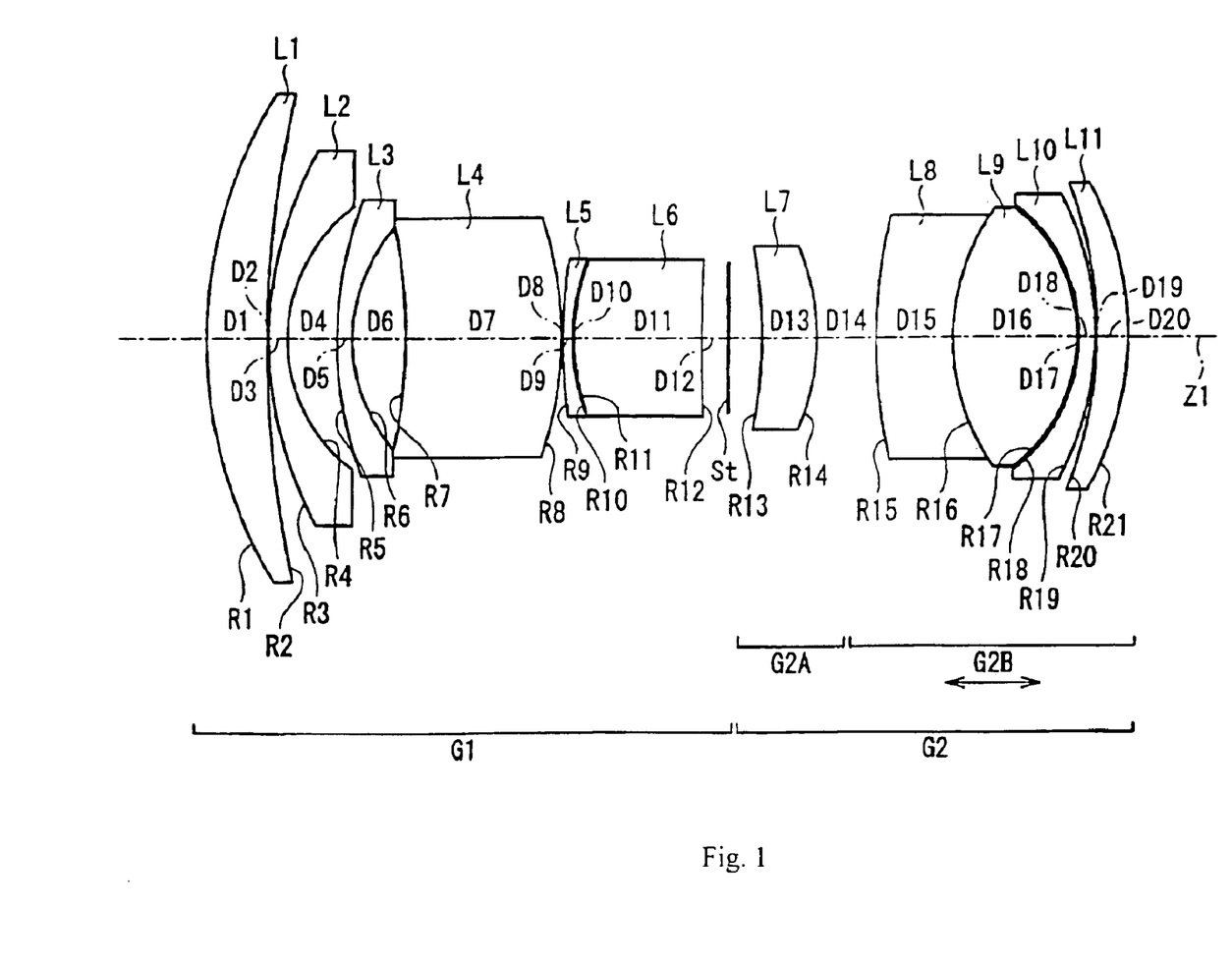
FIG. 1 shows a cross-sectional view of Embodiment 1 of the retrofocus, wide-angle lens of the present invention.

A general description of the retrofocus, wide-angle lens of the present invention that pertains to all three embodiments of the invention will first be described with reference to FIG. 1 that shows Embodiment 1. In FIG. 1, lens elements are referenced by the letter L followed by a number denoting their order from the object side of the retrofocus, wide-angle lens (i.e., L1 through L11). Similarly, the radii of Curvature of all the lens surfaces are referenced by the letter R followed by a number denoting their order from the object side (i.e., R1 through R21). The on-axis surface spacings (along the optical axis Z1 of FIG. 1) of all the lens surfaces are referenced by the letter D followed by a number denoting their order from the object side (i.e., D1 through D20), as shown in FIG. 1.

The major lens groups are labeled G1 and G2, in order from the object side, and alphabetical order letters A and B have been added for lens groups divided from lens group G2, (i.e., lens groups G2A and G2B in that order from the object side). A stop St that operates as an aperture stop is provided between lens groups G1 and G2.

The retrofocus, wide-angle lens of the present invention may be of the rear-focus type. A directional arrow in FIG. 1 associated with the bracket for lens group G2B indicates directions of movement of the lens group G2B relative to the other lens groups when the lens group G2B is moved for focusing, thus illustrating the present invention using a rear-focus mode of operation.

The retrofocus, wide-angle lens of the present invention is advantageously used as a wide-angle lens in a medium-sized, single lens reflex camera with a field angle of over eighty degrees and an f-number of about 3.5.

The first lens group G1 of negative refractive power includes, in order from the object side, at least one meniscus lens element having positive refractive power with its convex surface on the object side, and at least two meniscus lens elements having negative refractive power with their convex surfaces on the object side. Additionally, the at least two meniscus lens elements having negative refractive power may be arranged on the object side of a lens element that has a center thickness (i.e., measured along the optical axis Z1) that is larger than the center thicknesses of any of the other lens elements of lens group G1. Thus, as shown in FIG. 1, the lens element with the largest central thickness is lens element L4 and the lens element with the second largest central thickness is L6. This need not be the case, however. Instead of using lens element L4, its function may be divided among a plurality of lens elements, resulting in the lens element having the largest central thickness being L6.

As shown in FIG. 1, lens element L1 has positive refractive power and a meniscus shape with its convex surface on the object side. However, alternatively, the lens element L1 may be a meniscus lens element with negative refractive power. The lens elements L2 and L3 are the at least two meniscus lens elements having negative refractive power, that have their convex surfaces on the object side, and that are on the object side of the lens element with the largest central thickness.

As shown in FIG. 1, lens elements L5 and L6 of lens group G1 are arranged, in that order from the object side, on the image side of lens element L4 and lens element L4 has a large central thickness. Lens element L5 has negative refractive power and is meniscus shaped with its convex surface on the object side, and lens element L6 has positive refractive power and is meniscus shaped with its convex surface on the object side.

The second lens group G2 of positive refractive power includes, in order from the object side, a meniscus lens element L7 having positive refractive power with its convex surface on the image side, a lens element L8 having negative refractive power that is cemented to a biconvex lens element L9, a meniscus lens element L10 having negative refractive power with its concave surface on the object side, and a meniscus lens element L11 having positive refractive power with its concave surface on the object side. Lens element L10 is separated from the image-side surface of lens element L9 by an air space.

Preferably, the following Condition (1) is satisfied:

$$\nu B - \nu A > 25 \qquad \text{Condition (1)}$$

where
$\nu A$ is the Abbe number at the d-line (587.6 nm) of the lens material of lens element L8; and
$\nu B$ is the Abbe number at the d-line (587.6 nm) of the lens material of lens element L9.

Also, the following Condition (2) is preferably satisfied:

$$\nu B > 65 \qquad \text{Condition (2).}$$

Additionally, the following Condition (3) is preferably satisfied:

$$1.38 < |\phi 17/R17| < 1.65 \qquad \text{Condition (3)}$$

where
$\phi 17$ is the effective diameter of the image-side surface of lens element L9; and
R17 is the radius of curvature of the image-side surface of lens element L9.

Furthermore, the following Condition (4) is also preferably satisfied:

$$1 < R18/R17 < 1.08 \qquad \text{Condition (4)}$$

where
R18 is the radius of curvature of the object-side surface of lens element L10.

In addition, for favorable correction of aberrations, the following Conditions (5)–(8) are preferably satisfied:

$$\nu B - \nu A > 35 \qquad \text{Condition (5)}$$

$$\nu B > 80 \qquad \text{Condition (6)}$$

$$1.47 < |\phi 17/R17| < 1.58 \qquad \text{Condition (7)}$$

$$1.01 < R18/R17 < 1.03 \qquad \text{Condition (8)}$$

Additionally, it is desirable that the retrofocus, wide-angle lens satisfy the following Condition (9):

$$0 < D17/f < 0.01 \qquad \text{Condition (9)}$$

where
D17 is the distance along the optical axis between lens element L9 and lens element L10, and
f is the focal length of the retrofocus, wide-angle lens.
Also, it is desirable that the retrofocus, wide-angle lens satisfy the following Condition (10):

$$0 < D17/f < 0.003 \qquad \text{Condition (10).}$$

Next, functions and effects of the retrofocus, wide-angle lens of the present invention will be described.

In the retrofocus, wide-angle lens of the present invention, the correction of distortion is particularly facilitated by including a lens element with a relatively large thickness along the optical axis in the first lens group G1. Moreover, in this retrofocus, wide-angle lens, aspheric lens surfaces are unnecessary, which avoids complications inherent to their manufacture.

Conditions (1) and (2) mainly assist in correcting axial chromatic aberration and lateral color (up to a middle field angle). If Condition (1) is not satisfied, the correction of chromatic aberrations in the second lens group G2 becomes insufficient and it is difficult to properly balance corrections of axial chromatic aberration and lateral color for the entire retrofocus, wide-angle lens. If Condition (2) is not satisfied, an anomalous dispersion glass cannot be used, which makes correction of lateral color, especially at the g-line ($\lambda$=435.8 nm), very difficult.

Conditions (3) and (4) assist in correcting lateral color at the g-line ($\lambda$=435.8 nm) at the maximum field angle. If the ratio of Condition (3) is smaller than the lower limit of Condition (3), the contribution to high order chromatic aberrations created by the presence of air space D17 between lens elements L9 and L10, which compensates for other contributions, becomes too small at the maximum field angle, especially for the g-line ($\lambda$=435.8 nm). On the other hand, if the ratio of Condition (3) is larger than the upper limit of Condition (3), the contribution to high order aberrations created by the presence of air space D17 becomes so large that correction of coma aberration becomes difficult.

Condition (4) assists in correcting aberrations in essentially the same way as Condition (3), as described in the preceding paragraph.

The functions and effects given by satisfying Conditions (1)–(4) are further improved by satisfying Conditions (5)–(8).

The retrofocus, wide-angle lens of the present invention has advantages in enhancing imaging performance at close focusing distances and in reducing the torque necessary in anti-focusing compared with methods of focusing that move the entire second lens group G2. That is, by dividing the second lens group G2 into a stationary lens group G2A and a moving lens group G2B, the torque required for focusing is reduced.

Thus, the retrofocus, wide-angle lens of the present invention enables excellent correction of lateral color, achieves high optical performance and provides a long back focal length. These characteristics make the present invention particularly suitable for use as a wide-angle lens for a medium-sized single lens reflex camera.

Three embodiments of the present invention will now be individually described with reference to the drawings. In all three embodiments, the second lens group G2 is divided into two lens groups, G2A and G2B in that order from the object side, and focusing is achieved by moving the lens group G2B along the optical axis.

Embodiment 1

FIG. 1 shows the basic lens element configuration and lens group positions of the retrofocus, wide-angle lens of the present invention and specifically shows Embodiment 1.

Table 1 below lists the group identifier at the first object-side lens surface of the lens group, the surface number # in order from the object side, the radius of curvature R (in mm) of each surface, the on-axis surface spacing D (in mm), as well as the refractive index $N_d$ and the Abbe number $v_d$ (both at the d-line) of each lens element for Embodiment 1. Listed in the middle portion of Table 1 are the focal length f, the f-number $F_{NO}$, the maximum image angle $2\omega$, $\phi 17$, and the back focal length fB for Embodiment 1. Furthermore, listed in the bottom portion of Table 1 are the values corresponding to Conditions (1)–(10) for Embodiment 1.

Figure 4A:
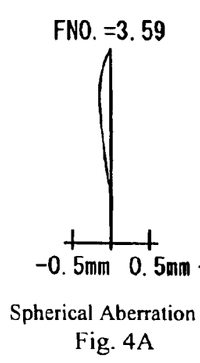
FIGS. 4A–4D show aberrations of Embodiment 1 of the retrofocus, wide-angle lens of the present invention when focused at infinity.
Figure 4B:
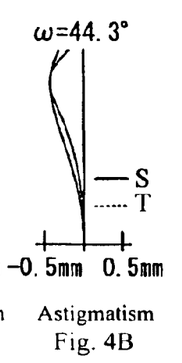
Figure 4C:
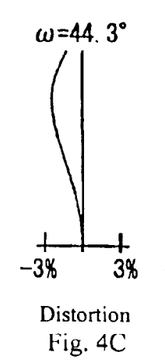
Figure 4D:
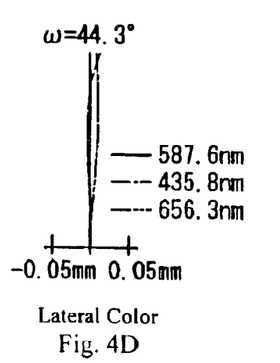

FIGS. 4A–4D show the spherical aberration, astigmatism, distortion, and lateral color, respectively, of the retrofocus, wide-angle lens of Embodiment 1. In FIGS. 4A–4C, aberrations are shown for the d-line ($\lambda$=587.6 nm). In FIG. 4B, the astigmatism is shown for both the sagittal image surface S and the tangential image surface T. In FIG. 4D, the lateral color is shown for the d-line ($\lambda$=587.6 nm), the g-line ($\lambda$=435.8 nm), and the C-line ($\lambda$=656.3 nm). As is apparent from these figures, the various aberrations are favorably corrected.

Embodiment 2

Figure 2:
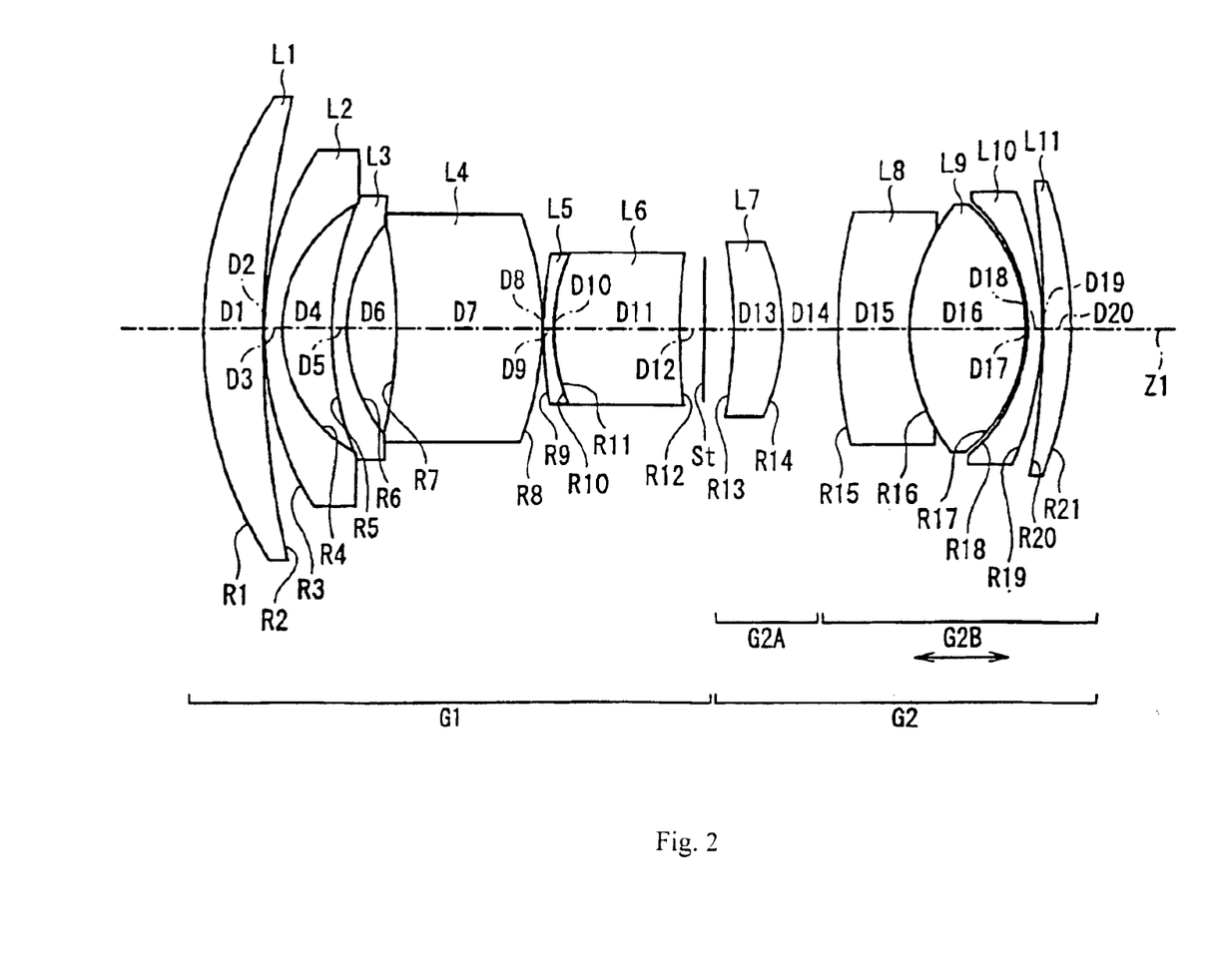
FIG. 2 shows a cross-sectional view of Embodiment 2 of the retrofocus, wide-angle lens of the present invention.

Embodiment 2, shown in FIG. 2, is very similar to Embodiment 1 and uses the same number of lens elements. Because Embodiment 2 is very similar to Embodiment 1, the differences between Embodiment 2 and Embodiment 1 will be evident from Table 2 that follows.

Table 2 below lists the group identifier at the first object-side lens surface of the lens group, the surface number # in order from the object side, the radius of curvature R (in mm) of each surface, the on-axis surface spacing D (in mm), as well as the refractive index $N_d$ and the Abbe number $v_d$ (both at the d-line) of each lens element for Embodiment 2. Listed in the middle portion of Table 2 are the focal length f, the f-number $F_{NO}$, the maximum image angle $2\omega$, $\phi 17$, and the back focal length fB for Embodiment 2. Furthermore, listed in the bottom portion of Table 2 are the values corresponding to Conditions (1)–(10) for Embodiment 2.

TABLE 1

| Group | # | R | D | $N_d$ | $v_d$ |
|---|---|---|---|---|---|
| G1 | 1 | 60.773 | 8.08 | 1.74330 | 49.2 |
|  | 2 | 145.341 | 0.15 |  |  |
|  | 3 | 50.635 | 2.44 | 1.84666 | 23.8 |
|  | 4 | 21.362 | 6.71 |  |  |
|  | 5 | 50.584 | 2.04 | 1.83400 | 37.3 |
|  | 6 | 22.224 | 7.08 |  |  |
|  | 7 | −71.429 | 20.95 | 1.48749 | 70.4 |
|  | 8 | −50.034 | 0.20 |  |  |
|  | 9 | 66.905 | 1.33 | 1.71300 | 53.9 |
|  | 10 | 28.050 | 0.18 |  |  |
|  | 11 | 31.476 | 17.17 | 1.80518 | 25.4 |
|  | 12 | 199.466 | 8.15 |  |  |
| G2–G2A | 13 | −61.313 | 7.41 | 1.51742 | 52.2 |
|  | 14 | −29.147 | 7.82 |  |  |
| G2B | 15 | 67.765 | 10.22 | 1.83400 | 37.3 (vA) |
|  | 16 | 29.528 | 16.64 | 1.49700 | 81.5 (vB) |
|  | 17 | −21.250 | 0.07 |  |  |
|  | 18 | −21.658 | 2.13 | 1.84666 | 23.9 |
|  | 19 | −39.582 | 0.20 |  |  |
|  | 20 | −55.071 | 4.18 | 1.48749 | 70.4 |
|  | 21 | −41.535 |  |  |  |
| f = 35.76 | $F_{NO}$ = 3.6 | $2\omega$ = 88.7° | $\phi 17$ = 32.364 | fB = 61.0 | |

Conditions (1), (5) value: vB − vA = 44.2
Conditions (2), (6) value: vB = 81.5
Conditions (3), (7) value: |$\phi 17$/R17| = 1.523
Conditions (4), (8) value: R18/R17 = 1.019
Conditions (9), (10) value: D17/f = 0.0020

TABLE 2

| Group | # | R | D | $N_d$ | $\nu_d$ |
|---|---|---|---|---|---|
| G1 | 1 | 60.484 | 8.05 | 1.74330 | 49.2 |
|  | 2 | 141.974 | 0.14 |  |  |
|  | 3 | 47.266 | 2.42 | 1.84666 | 23.8 |
|  | 4 | 19.757 | 6.68 |  |  |
|  | 5 | 46.555 | 2.02 | 1.83400 | 37.3 |
|  | 6 | 22.380 | 7.05 |  |  |
|  | 7 | −63.346 | 20.89 | 1.48749 | 70.4 |
|  | 8 | −44.221 | 0.19 |  |  |
|  | 9 | 57.873 | 1.32 | 1.71300 | 53.9 |
|  | 10 | 25.473 | 0.17 |  |  |
|  | 11 | 28.051 | 17.12 | 1.80518 | 25.4 |
|  | 12 | 93.852 | 7.73 |  |  |
| G2–G2A | 13 | −63.051 | 7.03 | 1.51742 | 52.2 |
|  | 14 | −27.783 | 7.69 |  |  |
| G2B | 15 | 65.236 | 9.70 | 1.80100 | 35.0 ($\nu$A) |
|  | 16 | 28.342 | 15.80 | 1.48749 | 70.4 ($\nu$B) |
|  | 17 | −21.792 | 0.06 |  |  |
|  | 18 | −22.927 | 2.02 | 1.84666 | 23.9 |
|  | 19 | −46.551 | 0.19 |  |  |
|  | 20 | −132.065 | 3.97 | 1.49700 | 81.5 |
|  | 21 | −57.285 |  |  |  |
| f = 35.81 | $F_{NO}$ = 3.6 | 2ω = 88.6° | φ17 = 30.531 | fB = 61.0 | |

Conditions (1), (5) value: $\nu$B − $\nu$A = 35.4
Conditions (2), (6) value: $\nu$B = 70.5
Conditions (3), (7) value: |φ17/R17| = 1.401
Conditions (4), (8) value: R18/R17 = 1.052
Conditions (9), (10) value: D17/f = 0.0017

Figure 5A:
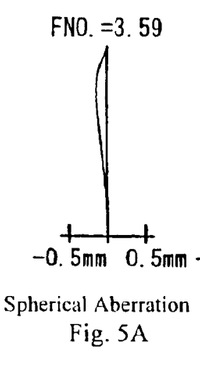
FIGS. 5A–5D show aberrations of Embodiment 2 of the retrofocus, wide-angle lens of the present invention when focused at infinity.
Figure 5B:
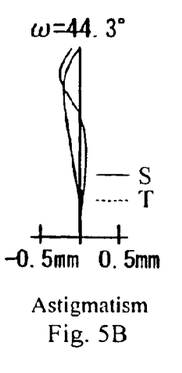
Figure 5C:
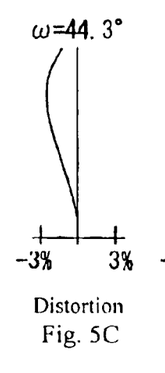
Figure 5D:
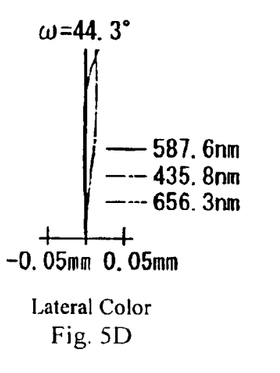

FIGS. 5A–5D show the spherical aberration, astigmatism, distortion, and lateral color, respectively, of the retrofocus, wide-angle lens of Embodiment 2. In FIGS. 5A–5C, aberrations are shown for the d-line (λ=587.6 nm). In FIG. 5B, the astigmatism is shown for both the sagittal image surface S and the tangential image surface T. In FIG. 5D, the lateral color is shown for the d-line (λ=587.6 nm), the g-line (λ=435.8 nm), and the C-line (λ=656.3 nm). As is apparent from these figures, the various aberrations are favorably corrected.

Embodiment 3

Figure 3:
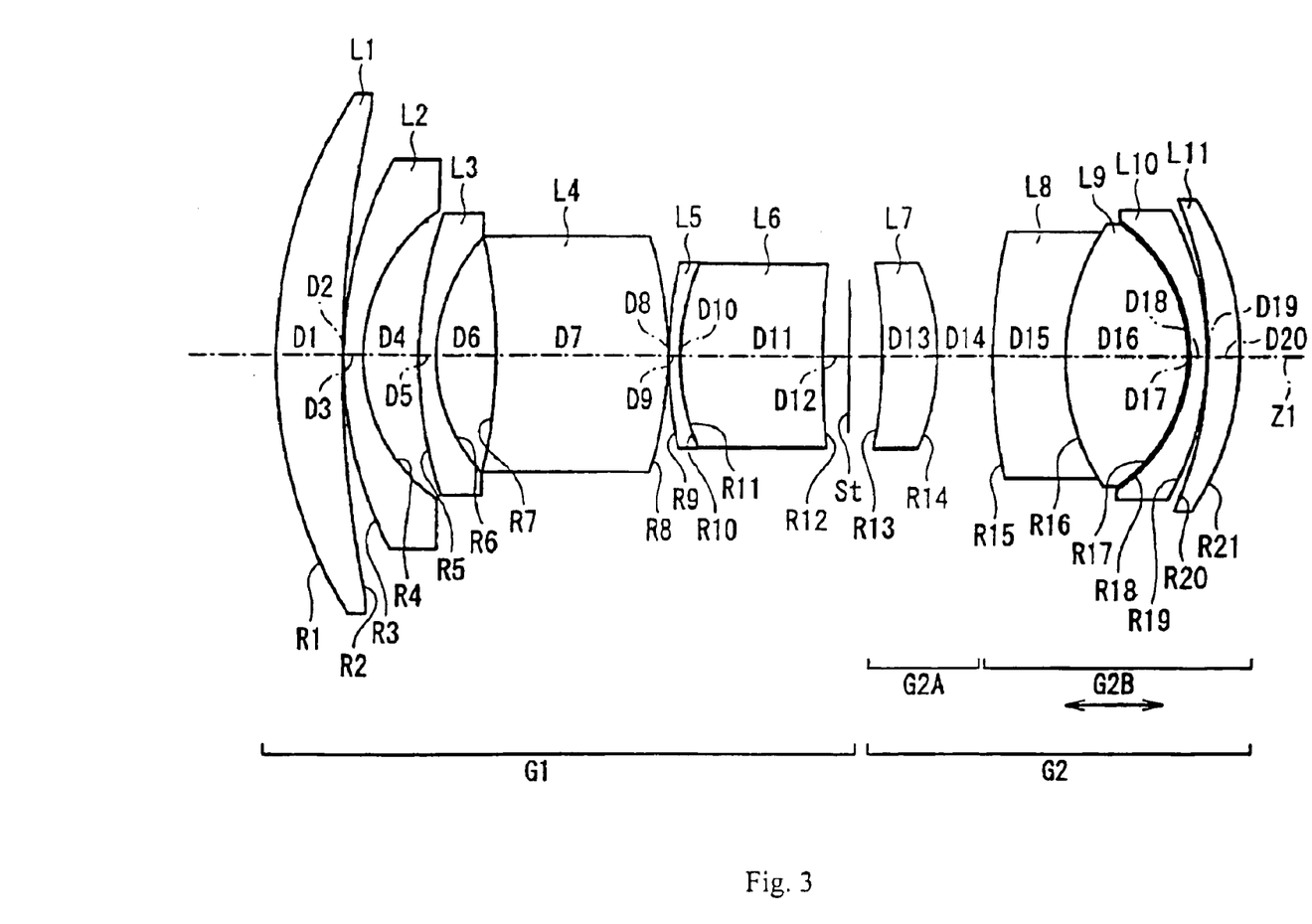
FIG. 3 shows a cross-sectional view of Embodiment 3 of the retrofocus, wide-angle lens of the present invention.

Embodiment 3, shown in FIG. 3, is very similar to Embodiment 1 and uses the same number of lens elements. Because Embodiment 3 is very similar to Embodiment 1, the differences between Embodiment 3 and Embodiment 1 will be evident from Table 3 that follows.

Table 3 below lists the group identifier at the first object-side lens surface of the lens group, the surface number # in order from the object side, the radius of curvature R (in mm) of each surface, the on-axis surface spacing D (in mm), as well as the refractive index $N_d$ and the Abbe number $\nu_d$ (both at the d-line) of each lens element for Embodiment 3. Listed in the middle portion of Table 3 are the focal length f, the f-number $F_{NO}$, the maximum image angle 2ω, φ17, and the back focal length fB for Embodiment 3. Furthermore, listed in the bottom portion of Table 3 are the values corresponding to Conditions (1)–(10) for Embodiment 3.

TABLE 3

| Group | # | R | D | $N_d$ | $\nu_d$ |
|---|---|---|---|---|---|
| G1 | 1 | 62.005 | 8.85 | 1.74330 | 49.2 |
|  | 2 | 148.937 | 0.15 |  |  |
|  | 3 | 53.638 | 2.66 | 1.84666 | 23.8 |
|  | 4 | 22.943 | 7.34 |  |  |
|  | 5 | 56.704 | 2.22 | 1.83400 | 37.3 |
|  | 6 | 22.637 | 7.75 |  |  |
|  | 7 | −68.815 | 22.97 | 1.48749 | 70.4 |
|  | 8 | −48.311 | 0.20 |  |  |
|  | 9 | 54.843 | 1.45 | 1.71300 | 53.9 |
|  | 10 | 28.243 | 0.18 |  |  |
|  | 11 | 31.940 | 18.83 | 1.80518 | 25.4 |
|  | 12 | 119.295 | 7.73 |  |  |
| G2–G2A | 13 | −62.883 | 7.03 | 1.51742 | 52.2 |
|  | 14 | −30.169 | 7.69 |  |  |
| G2B | 15 | 71.629 | 9.70 | 1.78590 | 44.2 ($\nu$A) |
|  | 16 | 29.656 | 15.80 | 1.49700 | 81.5 ($\nu$B) |
|  | 17 | −20.970 | 0.06 |  |  |
|  | 18 | −21.370 | 2.02 | 1.84666 | 23.9 |

TABLE 3-continued

| Group | # | R | D | $N_d$ | $\nu_d$ |
|---|---|---|---|---|---|
| | 19 | −40.625 | 0.19 | | |
| | 20 | −53.870 | 3.97 | 1.49700 | 81.5 |
| | 21 | −38.538 | | | |
| | f = 35.76 | $F_{NO}$ = 3.6 | 2ω = 88.7° | φ17 = 32.294 | fB = 61.0 |

Conditions (1), (5) value: νB − νA = 37.3
Conditions (2), (6) value: νB = 81.5
Conditions (3), (7) value: |φ17/R17| = 1.540
Conditions (4), (8) value: R18/R17 = 1.019
Conditions (9), (10) value: D17/f = 0.0017

Figure 6A:
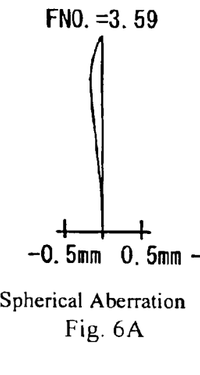
FIGS. 6A–6D show aberrations of Embodiment 3 of the retrofocus, wide-angle lens of the present invention when focused at infinity.
Figure 6B:
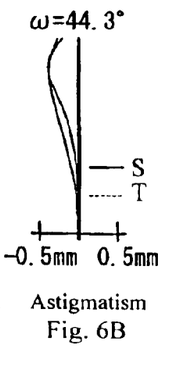
Figure 6C:
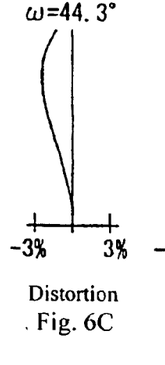
Figure 6D:
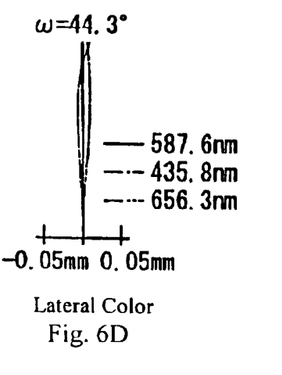

FIGS. 6A–6D show the spherical aberration, astigmatism, distortion, and lateral color, respectively, of the retrofocus, wide-angle lens of Embodiment 3. In FIGS. 6A–6C, aberrations are shown for the d-line (λ=587.6 nm). In FIG. 6B, the astigmatism is shown for both the sagittal image surface S and the tangential image surface T. In FIG. 6D, the lateral color is shown for the d-line (λ=587.6 nm), the g-line (λ=435.8 nm), and the C-line (λ=656.3 nm). As is apparent from these figures, the various aberrations are favorably corrected.

The present invention is not limited to the aforementioned embodiments, as it will be obvious that various alternative implementations are possible. For instance, values such as the radius of curvature R of each of the lens elements, the surface spacings D, the refractive index $N_d$, as well as the Abbe number $\nu_d$, are not limited to the examples indicated in each of the aforementioned embodiments, as other values can be adopted. Additionally, the retrofocus, wide-angle lens of the present invention may be used in various image forming devices other than the cameras discussed above. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A retrofocus, wide-angle lens formed of two lens groups, in order from the object side, as follows:
   a first lens group having negative refractive power;
   a stop; and
   a second lens group having positive refractive power; wherein
   said first lens group includes a meniscus lens element having positive refractive power with its convex surface on the object side, two meniscus lens elements, each of negative refractive power with its convex surface on the object side, and a lens that has a center thickness that is greater than the center thickness of any of said three meniscus lens elements; and
   said second lens group includes a cemented lens component that includes a lens element having negative refractive power that is cemented to a biconvex lens element, an air space, and a meniscus lens component having negative refractive power with its concave surface on the object side.

2. The retrofocus, wide-angle lens of claim 1, wherein said meniscus lens component of said second lens group consists of a lens element.

3. The retrofocus, wide-angle lens of claim 2, wherein said meniscus lens component of said second lens group is separated from said biconvex lens element only by said air space.

4. The retrofocus, wide-angle lens of claim 3, wherein the following condition is satisfied:

$$1 < |R/R'| < 1.08$$

where
   R is the radius of curvature of the object-side lens surface of said meniscus lens component of said second lens group; and
   R' is the radius of curvature of the image-side lens surface of said biconvex lens element.

5. The retrofocus, wide-angle lens of claim 4, wherein the following conditions are satisfied:

$$\nu B - \nu A > 25$$

$$\nu B > 65$$

$$1.38 < |\phi/R'| < 1.65$$

where
   νA is the Abbe number at the d-line of the lens material of the lens element having negative refractive power of the cemented lens component of the second lens group;
   νB is the Abbe number at the d-line of the lens material of said biconvex lens element of the second lens group; and
   φ is the effective diameter of the image-side lens surface of said biconvex lens element of the second lens group.

6. The retrofocus, wide-angle lens of claim 5, wherein said second lens group comprises, in order from the object side:
   the meniscus lens component having positive refractive power with its convex surface on the image side;
   the lens element of said cemented lens component having negative refractive power;
   the biconvex lens element of said cemented lens component;
   the meniscus lens component having negative refractive power with its concave surface on the object side; and
   a second meniscus lens component having positive refractive power with its convex surface on the image side.

7. The retrofocus, wide-angle lens of claim 2, wherein the following condition is satisfied:

$$1 < |R/R'| < 1.08$$

where
   R is the radius of curvature of the object-side lens surface of said meniscus lens component of said second lens group; and
   R' is the radius of curvature of the image-side lens surface of said biconvex lens element.

8. The retrofocus, wide-angle lens of claim 7, wherein the following conditions are satisfied:

$$vB-vA>25$$

$$vB>65$$

$$1.38<|\phi/R'|<1.65$$

where vA is the Abbe number at the d-line of the lens material of the lens element having negative refractive power of the cemented lens component of the second lens group;

vB is the Abbe number at the d-line of the lens material of said biconvex lens element of the second lens group; and φ is the effective diameter of the image-side lens surface of said biconvex lens element of the second lens group.

9. The retrofocus, wide-angle lens of claim 8, wherein said second lens group comprises, in order from the object side:

the meniscus lens component having positive refractive power with its convex surface on the image side;

the lens element of said cemented lens component having negative refractive power;

the biconvex lens element of said cemented lens component;

the meniscus lens component having negative refractive power with its concave surface on the object side; and a second meniscus lens component having positive refractive power with its convex surface on the image side.

10. The retrofocus, wide-angle lens of claim 7, wherein said second lens group comprises, in order from the object side:

the meniscus lens component having positive refractive power with its convex surface on the image side;

the lens element of said cemented lens component having negative refractive power;

the biconvex lens element of said cemented lens component;

the meniscus lens component having negative refractive power with its concave surface on the object side; and a second meniscus lens component having positive refractive power with its convex surface on the image side.

11. The retrofocus, wide-angle lens of claim 1, wherein said meniscus lens component of said second lens group is separated from said biconvex lens element only by said air space.

12. The retrofocus, wide-angle lens of claim 11, wherein the following condition is satisfied:

$$1<|R/R'|<1.08$$

where

R is the radius of curvature of the object-side lens surface of said meniscus lens component of said second lens group; and R' is the radius of curvature of the image-side lens surface of said biconvex lens element.

13. The retrofocus, wide-angle lens of claim 12, wherein the following conditions are satisfied:

$$vB-vA>25$$

$$vB>65$$

$$1.38<|\phi/R'|<1.65$$

where vA is the Abbe number at the d-line of the lens material of the lens element having negative refractive power of the cemented lens component of the second lens group;

vB is the Abbe number at the d-line of the lens material of said biconvex lens element of the second lens group; and φ is the effective diameter of the image-side lens surface of said biconvex lens element of the second lens group.

14. The retrofocus, wide-angle lens of claim 13, wherein said second lens group comprises, in order from the object side;

the meniscus lens component having positive refractive power with its convex surface on the image side;

the lens element of said cemented lens component having negative refractive power;

the biconvex lens element of said cemented lens component;

the meniscus lens component having negative refractive power with its concave surface on the object side; and a second meniscus lens component having positive refractive power with its convex surface on the image side.

15. The retrofocus, wide-angle lens of claim 1, wherein the following condition is satisfied:

$$1<|R/R'|<1.08$$

where

R is the radius of curvature of the object-side lens surface of said meniscus lens component of said second lens group; and R' is the radius of curvature of the image-side lens surface of said biconvex lens element.

16. The retrofocus, wide-angle lens of claim 15, wherein the following conditions are satisfied:

$$vB-vA>25$$

$$vB>65$$

$$1.38<|\phi/R'|<1.65$$

where vA is the Abbe number at the d-line of the lens material of the lens element having negative refractive power of the cemented lens component of the second lens group;

vB is the Abbe number at the d-line of the lens material of said biconvex lens element of the second lens group; and φ is the effective diameter of the image-side lens surface of said biconvex lens element of the second lens group.

17. The retrofocus, wide-angle lens of claim 16, wherein said second lens group comprises, in order from the object side:

the meniscus lens component having positive refractive power with its convex surface on the image side;

the lens element of said cemented lens component having negative refractive power;

the biconvex lens element of said cemented lens component;

the meniscus lens component having negative refractive power with its concave surface on the object side; and a second meniscus lens component having positive refractive power with its convex surface on the image side.

18. The retrofocus, wide-angle lens of claim 1, wherein the following conditions are satisfied:

$$\nu B - \nu A > 25$$
$$\nu B > 65$$
$$1.38 < |\phi/R'| < 1.65$$

where
- $\nu A$ is the Abbe number at the d-line of the lens material of the lens element having negative refractive power of the cemented lens component of the second lens group;
- $\nu B$ is the Abbe number at the d-line of the lens material of said biconvex lens element of the second lens group;
- $\phi$ is the effective diameter of the image-side lens surface of said biconvex lens element of the second lens group; and
- $R'$ is the radius of curvature of the image-side lens surface of said biconvex lens element.

19. The retrofocus, wide-angle lens of claim 18, wherein said second lens group comprises, in order from the object side:
- the meniscus lens component having positive refractive power with its convex surface on the image side;
- the lens element of said cemented lens component having negative refractive power;
- the biconvex lens element of said cemented lens component;
- the meniscus lens component having negative refractive power with its concave surface on the object side; and
- a second meniscus lens component having positive refractive power with its convex surface on the image side.

20. The retrofocus, wide-angle lens of claim 1, wherein said second lens group comprises, in order from the object side:
- the meniscus lens component having positive refractive power with its convex surface on the image side;
- the lens element of said cemented lens component having negative refractive power;
- the biconvex lens element of said cemented lens component;
- the meniscus lens component having negative refractive power with its concave surface on the object side; and
- a second meniscus lens component having positive refractive power with its convex surfac e on the image side.

* * * * *

UNITED STATES PATENT AND TRADEMARK OFFICE
CERTIFICATE OF CORRECTION

PATENT NO. : 6,894,847 B2  Page 1 of 1
APPLICATION NO. : 10/743824
DATED : May 17, 2005
INVENTOR(S) : Takashi Suzuki It is certified that error appears in the above-identified patent and that said Letters Patent is hereby corrected as shown below:

On the title page (22), change the filing date so as to read --Dec. 29, 2003--.

Signed and Sealed this

Nineteenth Day of August, 2008

JON W. DUDAS
*Director of the United States Patent and Trademark Office*